United States Patent
Ichihara

(10) Patent No.: US 10,546,601 B1
(45) Date of Patent: Jan. 28, 2020

(54) METHOD OF SETTING UPPER LIMIT VALUE OF NUMBER OF WRITE TIMES AND MAGNETIC DISK DEVICE

(71) Applicants: TOSHIBA ELECTRONIC DEVICES & STORAGE CORPORATION, Tokyo (JP); KABUSHIKI KAISHA TOSHIBA, Tokyo (JP)

(72) Inventor: Kazuhito Ichihara, Tachikawa Tokyo (JP)

(73) Assignees: TOSHIBA ELECTRONIC DEVICES & STORAGE CORPORATION, Tokyo (JP); KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 16/290,389

(22) Filed: Mar. 1, 2019

(30) Foreign Application Priority Data

Sep. 18, 2018 (JP) .................... 2018 1738

(51) Int. Cl.
| | |
|---|---|
| *G11B 20/18* | (2006.01) |
| *G11B 27/36* | (2006.01) |
| *G11B 5/012* | (2006.01) |
| *G06F 11/07* | (2006.01) |
| *G11B 5/09* | (2006.01) |

(52) U.S. Cl.
CPC .......... *G11B 5/012* (2013.01); *G06F 11/076* (2013.01); *G06F 11/0727* (2013.01); *G06F 11/0793* (2013.01); *G11B 5/09* (2013.01)

(58) Field of Classification Search
CPC ... G11B 20/10009; G11B 27/36; G11B 20/18; G11B 27/24; G11B 7/1263; G11B 20/10305
USPC ....... 360/25, 31, 53; 369/47.46, 47.53, 53.1, 369/53.24, 53.32
See application file for complete search history.

(56) References Cited

U.S. PATENT DOCUMENTS

| | | | |
|---|---|---|---|
| 6,545,832 B1 | 4/2003 | Sugawara et al. | |
| 7,389,450 B2 * | 6/2008 | Fleischer-Reumann | ..................... G01R 31/3016 714/704 |
| 7,777,979 B2 | 8/2010 | Suzuki et al. | |
| 2008/0019030 A1 | 1/2008 | Nakao | |

* cited by examiner

*Primary Examiner* — Nabil Z Hindi
(74) *Attorney, Agent, or Firm* — Kim & Stewart LLP

(57) ABSTRACT

A method of setting an upper limit value of the number of write times, which is applied to a magnetic disk device including a disk and a head configured to write data to the disk and read the data from the disk, includes measuring a plurality of bit error rates in a recording area of the disk upon repeatedly writing to an area of the disk adjacent to the recording area a number of write times, deriving a function that approximates a bit error rate in relation to a number of write times, using the measured bit rates corresponding to at least a first number of write times, a second number of write times, and a third number of write times, and applying the function to determine a number of write times that correspond to a first threshold bit error rate that makes the data on the disk unreadable, and setting the determined number of write times as the upper limit value of the number of write times.

12 Claims, 7 Drawing Sheets

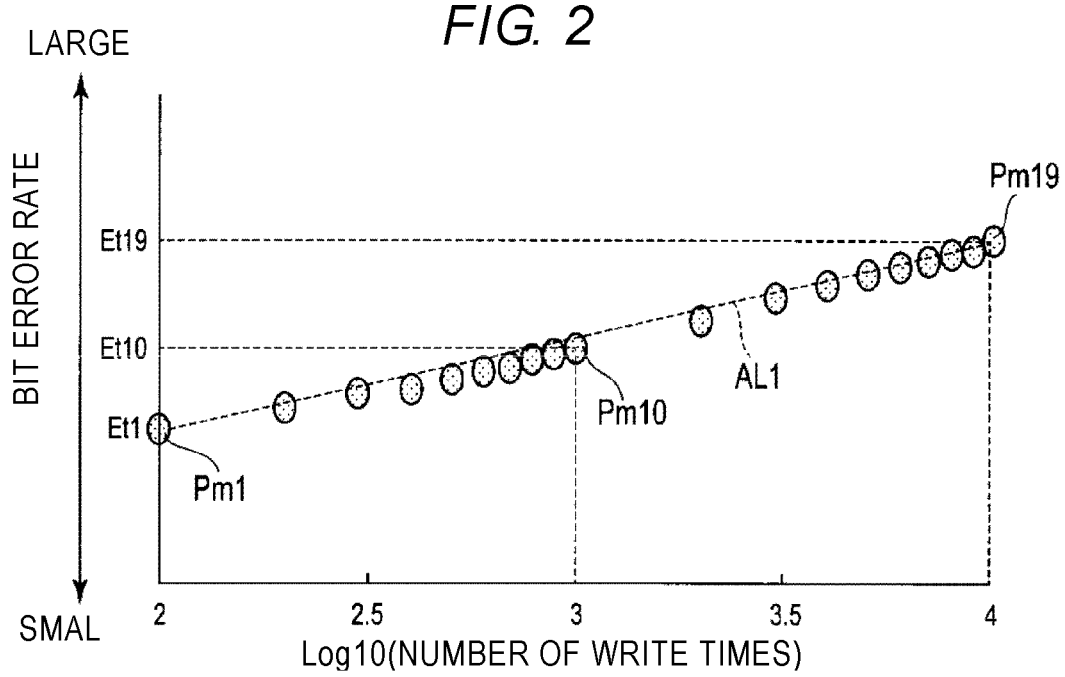
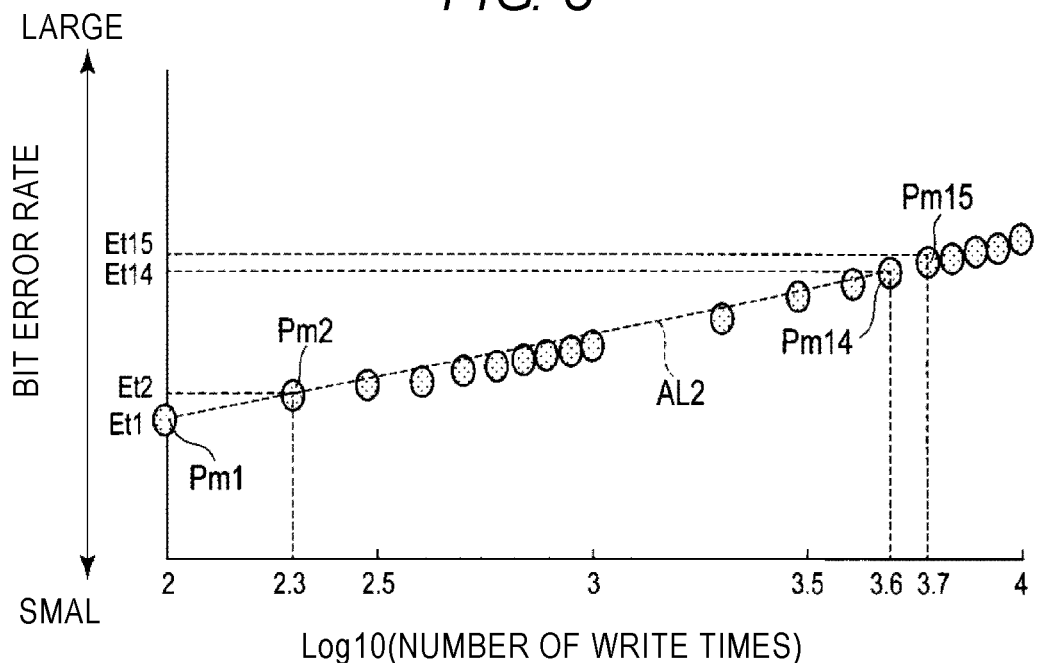

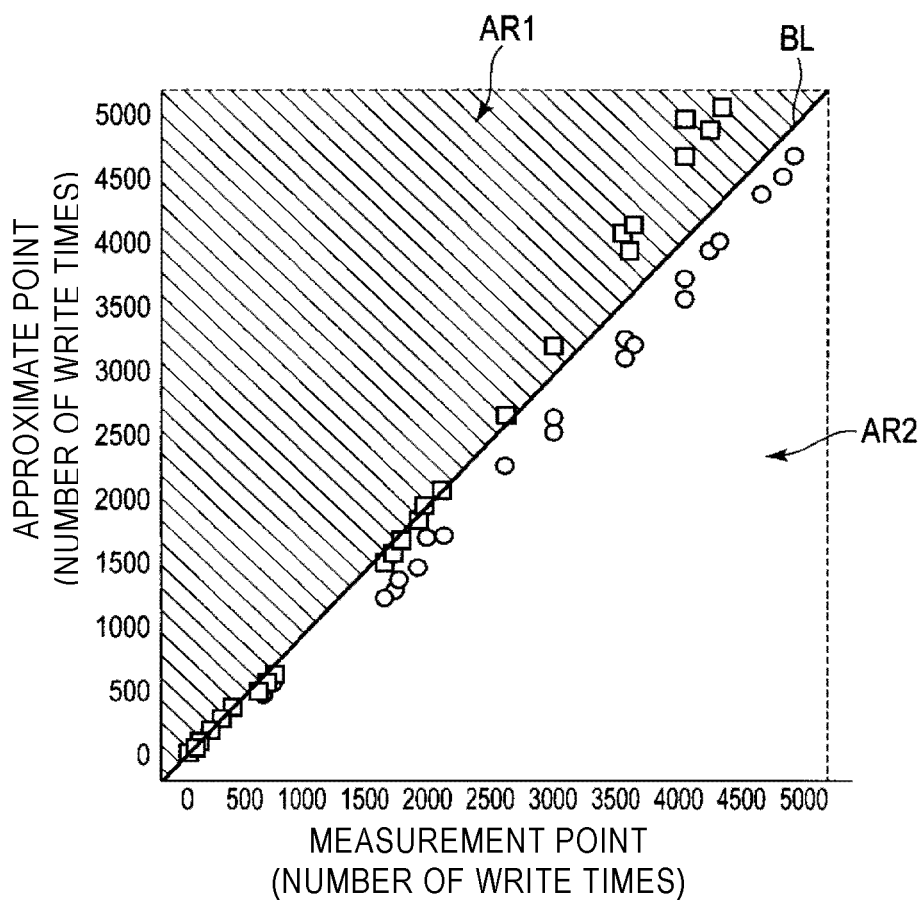

METHOD OF SETTING UPPER LIMIT VALUE OF NUMBER OF WRITE TIMES AND MAGNETIC DISK DEVICE

CROSS-REFERENCE TO RELATED APPLICATIONS

This application is based upon and claims the benefit of priority from Japanese Patent Application No. 2018-173877, filed Sep. 18, 2018, the entire contents of which are incorporated herein by reference.

FIELD

Embodiments described herein relate generally to a method of setting the upper limit value of the number of write times and a magnetic disk device.

BACKGROUND

In a magnetic disk device, when data is written, a so-called "side erase" may occur due to adjacent track interference (ATI) such as, for example, a leakage of magnetic flux from a head. The "ATI" differs depending on, for example, the characteristics of the head, a track-per-inch (TPI) setting value, and a write current setting value. In order to prevent the side erase due to the ATI, the magnetic disk device has a function of rewriting data (known as refresh function) in a predetermined track before the number of times of writing data (the number of write times) to a peripheral track of the predetermined track reaches an upper limit at which the side erase does not occur due to ATI.

DESCRIPTION OF THE DRAWINGS

FIG. 2 is a diagram illustrating an example of a sample approximate line acquired by three test points.

FIG. 3 is a diagram illustrating an example of a sample approximate line acquired by four test points.

FIG. 12 is a diagram illustrating an example of a relationship between approximate points and measurement points in a predetermined recording area of a disk.

DETAILED DESCRIPTION

Embodiments provide a method of setting the upper limit value of the number of write times which is highly accurate and is capable of shortening a processing time and a magnetic disk device.

In general, according to one embodiment, a method of setting an upper limit value of the number of write times, which is applied to a magnetic disk device including a disk and a head configured to write data to the disk and read the data from the disk, includes measuring a plurality of bit error rates in a recording area of the disk upon repeatedly writing to an area of the disk adjacent to the recording area a number of write times, deriving a function that approximates a bit error rate in relation to a number of write times, using the measured bit rates corresponding to at least a first number of write times, a second number of write times, and a third number of write times, and applying the function to determine a number of write times that correspond to a first threshold bit error rate that makes the data on the disk unreadable (i.e., data having a bit error rate that is greater than or equal to the first threshold bit error rate is unreadable, but data having a bit error rate that is less than the first threshold bit error rate is correctable and thus readable after correction), and setting the determined number of write times as the upper limit value of the number of write times.

According to another embodiment, a magnetic disk device includes a disk, a head configured to write data to the disk and read the data from the disk, and a controller configured to measure a plurality of bit error rates in a recording area of the disk upon repeatedly writing to an area of the disk adjacent to the recording area a number of write times, derive a function that approximates a bit error rate in relation to a number of write times, using the measured bit rates corresponding to at least a first number of write times, a second number of write times, and a third number of write times, apply the function to determine a number of write times that correspond to a first threshold bit error rate that makes the data on the disk unreadable, and set the determined number of write times as the upper limit value of the number of write times.

Hereinafter, embodiments will be described with reference to the drawings. The drawings are merely given by way of example of the embodiments and do not limit the scope of the disclosure.

Embodiment

Figure 1:
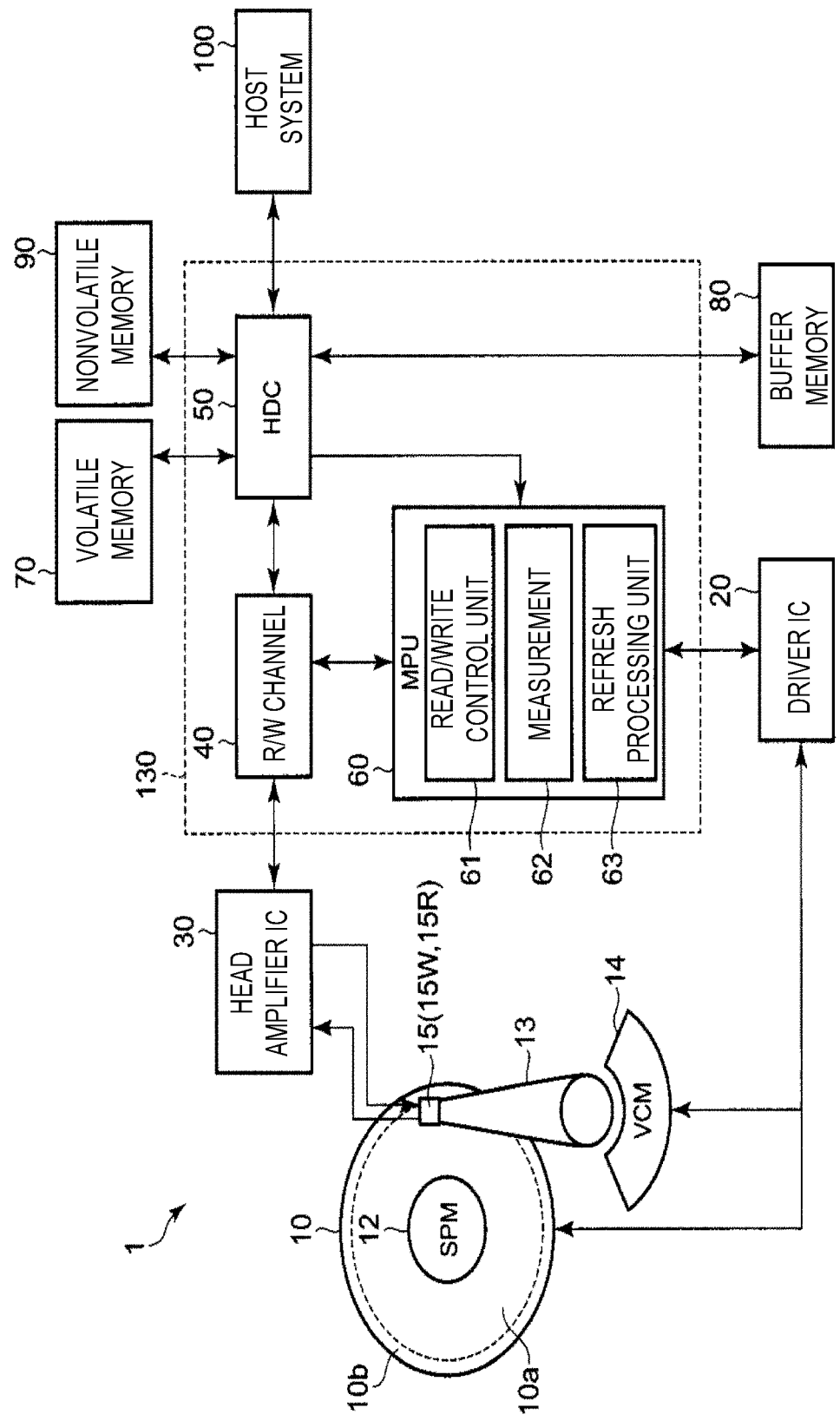
FIG. 1 is a block diagram illustrating a configuration of a magnetic disk device according to an embodiment.

FIG. 1 is a block diagram illustrating a configuration of a magnetic disk device 1 according to an embodiment.

The magnetic disk device 1 includes a head/disk assembly (HDA), a driver IC 20, a head amplifier integrated circuit (hereinafter, referred to as a head amplifier IC or a preamplifier) 30, a volatile memory 70, a buffer memory (buffer) 80, a nonvolatile memory 90, and a system controller 130, which is implemented as a single chip integrated circuit, all of which will be described later. In addition, the magnetic disk device 1 is connected to a host system (hereinafter, simply referred to as a host) 100.

The HDA includes a magnetic disk (hereinafter, referred to as a disk) 10, a spindle motor (hereinafter, referred to as an SPM) 12, an arm 13 on which a head 15 is mounted, and a voice coil motor 14 (hereinafter, referred to as a VCM). The disk 10 is attached to the spindle motor 12 and is rotated by driving of the spindle motor 12. The arm 13 and the VCM 14 form an actuator. The actuator controls the movement of the head 15 mounted on the arm 13 to a target position on the disk 10 by driving the VCM 14. Two or more disks 10 and two or more heads 15 may be provided.

In the disk 10, a user data area 10a that may be used by a user and a system area 10b in which information necessary for system management is written are allocated to an area in which data is writable. Hereinafter, the direction orthogonal to the radial direction of the disk 10 is referred to as a circumferential direction.

The head 15 includes a slider as a body and a write head 15W and a read head 15R which are mounted on the slider. The write head 15W writes data on the disk 10. The read head 15R reads data recorded in a data track on the disk 10.

The driver IC 20 controls the driving of the SPM 12 and the VCM 14 according to the control of the system controller 130 (more specifically, an MPU (microprocessing unit) 60 to be described later).

The head amplifier IC (also referred to as a preamplifier) 30 includes a read amplifier and a write driver. The read amplifier amplifies a read signal read from the disk 10 and outputs the amplified signal to the system controller 130 (more specifically, a read/write (R/W) channel 40 to be described later). The write driver outputs write current depending on a signal output from the R/W channel 40 to the head 15.

The volatile memory 70 is a semiconductor memory in which stored data is lost when the supply of power is cut off. The volatile memory 70 stores, for example, data necessary for processing in each part of the magnetic disk device 1. The volatile memory 70 is, for example, a dynamic random access memory (DRAM) or a synchronous dynamic random access memory (SDRAM).

The buffer memory 80 is a semiconductor memory that temporarily records, for example, data transmitted and received between the magnetic disk device 1 and the host 100. In addition, the buffer memory 80 may be formed integrally with the volatile memory 70. The buffer memory 80 is, for example, a DRAM, a static random access memory (SRAM), a SDRAM, a ferroelectric random access memory (FeRAM), or a magnetoresistive random access memory (MRAM).

The nonvolatile memory 90 is a semiconductor memory that retains data stored therein even when the supply of power is cut off. The nonvolatile memory 90 is, for example, a NOR type or NAND type flash read only memory (FROM).

The system controller (controller) 130 is implemented using, for example, a large scale integrated circuit (LSI) called a System-on-a-Chip (SoC) in which a plurality of elements are integrated in a single chip. The system controller 130 includes the read/write (R/W) channel 40, a hard disk controller (HDC) 50, and the microprocessor (MPU) 60. The system controller 130 is electrically connected to the driver IC 20, to the head amplifier IC 30, to the volatile memory 70, to the buffer memory 80, to the nonvolatile memory 90, and to the host system 100.

The R/W channel 40 executes a signal processing of read data transferred from the disk 10 to the host 100 and write data transferred from the host 100 in response to an instruction from the MPU 60 to be described later. The R/W channel 40 has a circuit or a function for measuring the signal quality of read data. The R/W channel 40 is electrically connected, for example, to the head amplifier IC 30, to the HDC 50, and to the MPU 60.

The HDC 50 controls data transfer between the host 100 and the R/W channel 40 in response to an instruction from the MPU 60 to be described later. The HDC 50 is electrically connected, for example, to the R/W channel 40, to the MPU 60, to the volatile memory 70, to the buffer memory 80, and to the nonvolatile memory 90.

The MPU 60 is a main controller that controls each part of the magnetic disk device 1. The MPU 60 controls the VCM 14 via the driver IC 20 and executes servo control for positioning the head 15. The MPU 60 controls an operation of writing data to the disk 10 and selects a storage destination of write data. In addition, the MPU 60 controls an operation of reading data from the disk 10 and controls a processing of read data. The MPU 60 is connected to each part of the magnetic disk device 1. The MPU 60 is electrically connected, for example, to the driver IC 20, to the R/W channel 40, and to the HDC 50.

The MPU 60 is programmed to function as a read/write control unit 61, a measurement unit 62, and a refresh processing unit 63. The MPU 60 executes processing of these units, for example, the read/write control unit 61, the measurement unit 62, and the refresh processing unit 63, according to firmware. Alternatively, these units may be implemented as dedicated circuits.

The read/write control unit 61 controls a read processing and a write processing of data in response to a command from the host 100. The read/write control unit 61 controls the VCM 14 via the driver IC 20, positions the head 15 at a target position on the disk 10, and reads or writes data.

The measurement unit 62 counts the number of times that data is written (hereinafter, referred to as the number of write times) to an area adjacent to a predetermined area in the radial direction (hereinafter, referred to as an adjacent area). The adjacent area is, for example, a track adjacent to a predetermined track (hereinafter, also referred to as an adjacent track). For example, the measurement unit 62 counts the number of write times for each track on the disk 10. In addition, although the measurement unit 62 counts the number of write times when data is written in the adjacent area, the measurement unit 62 may also count the number of write times even when data is written in an area that is farther away than the adjacent area in the radial direction.

The measurement unit 62 holds the counted number for each track. Whenever data is written to an adjacent track of a predetermined track, the measurement unit 62 adds a predetermined value, for example, 1 to the number of write times corresponding to the predetermined track. In addition, the measurement unit 62 stores a threshold (hereinafter, referred to as a refresh threshold) for executing a processing of first reading data written in a predetermined recording area and rewriting the read data in the predetermined recording area (hereinafter, referred to as a refresh processing). For example, the measurement unit 62 stores the refresh threshold for each track. The refresh threshold is, for example, the number of write times that is equal to or less than an upper limit (hereinafter, referred to as a guaranteed number) at which data in a predetermined track is not erased due to adjacent track interference (ATI) such as, for example, the leakage of magnetic flux from the head 15 when data is written to an adjacent track of the predetermined track. The measurement unit 62 holds the guaranteed number for each track. For example, a plurality of bit error rates (BERs) corresponding respectively to a plurality of write times in a predetermined track are measured, and the guaranteed number is set based on the plurality of measured bit error rates. The number of write times at which the bit error rates are measured in order to set the guaranteed number in a predetermined track may be referred to as the number of settings, and the bit error rates corresponding to the number of settings may be referred to as setting bit error rates. In addition, the setting bit error rates corresponding to a predetermined number of settings may be referred to as setting points. For example, the number of settings is set to an optimum number for each head or disk. Details of the method of setting the guaranteed number will be described later. For example, the guaranteed number is set based on an approximate line indicating a change in the bit error rate with respect to the number of write times in a predetermined recording area acquired via approximation using a plurality of setting points (hereinafter, referred to as an approximate line or an approximate expression) and a threshold of the bit error rate having a high possibility of making data unreadable (hereinafter, referred to as a bit error rate threshold). In addition, the measurement unit 62 may set a plurality of settings in a predetermined track, measure a plurality of setting bit error rates corresponding respectively to the plurality of settings, and set the guaranteed number based on the plurality of measured setting bit error rates. For example, the measurement unit 62 sets the guaranteed number based on an approximate line acquired based on a plurality of setting bit error rates and a bit error rate threshold.

When it is determined that the number of write times in a predetermined track is greater than a refresh threshold, the measurement unit 62 outputs a signal for executing a refresh processing on a predetermined track (hereinafter, referred to as a refresh signal) to the refresh processing unit 63 to be described later. When receiving a signal for which the refresh processing has been completed, the measurement unit 62 may change the number of write times in the predetermined track on which the refresh processing has been executed to the counted number when no data is written in an adjacent area, for example, 0.

The measurement unit 62 manages, for example, the number of write times, the refresh threshold of each track using a table, and the like. The measurement unit 62 records the table in a memory, for example, the nonvolatile memory 90 or the system area 10b.

The refresh processing unit 63 executes a refresh processing. For example, when receiving a refresh signal from the measurement unit 62, the refresh processing unit 63 executes a refresh processing on the track corresponding to the refresh signal. Upon executing the refresh processing, the refresh processing unit 63 outputs, for example, a signal indicating that the refresh processing has been completed to the measurement unit 62.

Hereinafter, a method of setting the guaranteed number according to the present embodiment will be described with reference to the drawings. The method of setting the guaranteed number may be executed by a processing of the MPU 60 of the magnetic disk device 1 described above, or may be executed at the prototype stage of the magnetic disk device 1.

In the present embodiment, the number of settings for setting the guaranteed number may be set to any number. For example, at the prototype stage of the magnetic disk device 1, a plurality of bit error rates corresponding respectively to a plurality of write times are measured in a predetermined recording area. Here, the predetermined recording area is, for example, a track. Hereinafter, bit error rates obtained by measurement may be referred to as measurement bit error rates, and the number of write times corresponding to the measurement bit error rates may be referred to as the number of measurements. In addition, the measurement bit error rates corresponding to a predetermined number of measurements may be referred to as measurement points (or measurement values). Several measurement points among a plurality of measurement points are selected. Hereinafter, measurement points selected from among a plurality of measurement points measured for setting the number of settings may be referred to as test points, measurement bit error rates corresponding to the test points may be referred to as test bit error rates, and the number of measurements corresponding to the test points may be referred to as the number of tests. An approximate line indicating a change in the bit error rate with respect to the number of write times in a predetermined recording area (hereinafter, referred to as a sample approximate line or a sample approximate expression) is acquired by selected several test points. The method of least squares may be used as the technique for acquiring the approximate line. Hereinafter, bit error rates acquired based on the sample approximate line (or the approximate line) may be referred to as approximate bit error rates, and the number of write times corresponding to the approximate bit error rates may be referred to as the number of approximations. In addition, the approximate bit error rates corresponding to a predetermined number of approximations may be referred to as approximate points (or approximate values). A measurement point is compared with an approximate point which is calculated based on the sample approximate line (sample approximate expression) and the measurement point. In addition, a plurality of measurement points may be compared with a plurality of approximate points which correspond respectively to the plurality of measurement points on a sample approximate line. By repeating the comparison between the measurement point and the approximate point corresponding to the measurement point while changing the number of test points selected from among a plurality of measurement points which are measured or changing the test points, the number of test points and the test points which enable the acquisition of an optimum sample approximate line are respectively set to the number of setting points and the setting points. In addition, the number of several tests corresponding respectively to several test points which are set to the setting points is set to the number of settings.

Figure 4:
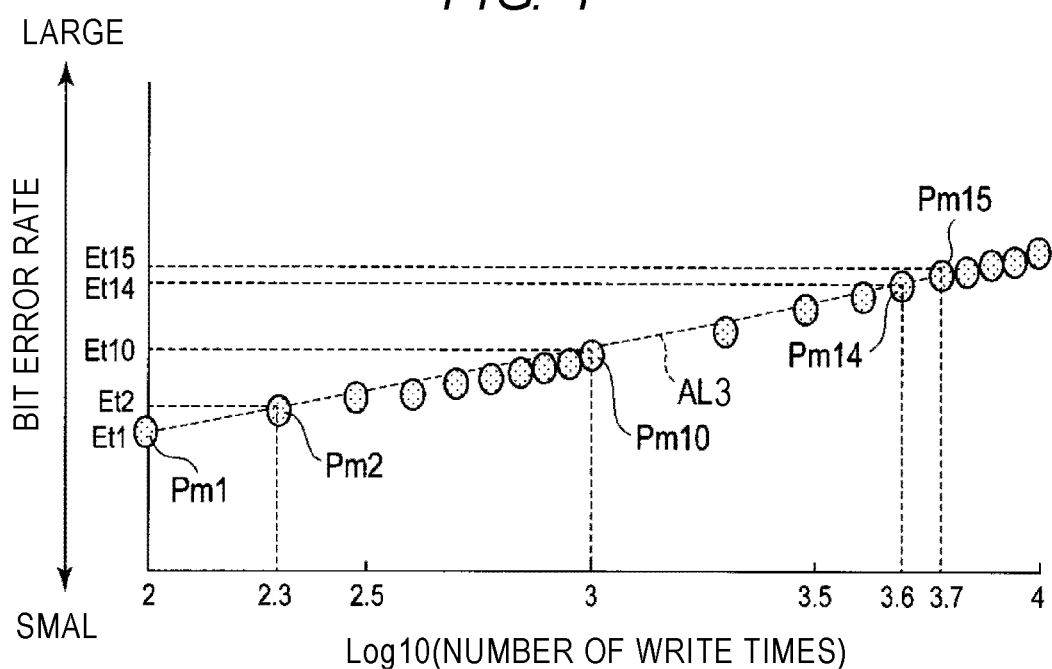
FIG. 4 is a diagram illustrating an example of a sample approximate line acquired by five test points.

An example of a sample approximate line will be described with reference to FIGS. 2, 3, and 4. In FIGS. 2 to 4, the horizontal axis represents Log 10 of the number of write times and the vertical axis represents the bit error rate. In the vertical axis, the bit error rate increases as it goes in the direction of the arrow "large," and the bit error rate decreases as it goes in the direction of the arrow "small." In FIGS. 2 to 4, nineteen circular points are measurement points which are measured in a predetermined recording area of the disk 10. In FIGS. 2 to 4, the nineteen measurement points indicate measurement bit error rates corresponding to the number of measurements of 100, 200, 300, 400, 500, 600, 700, 800, 900, 1000, 2000, 3000, 4000, 5000, 6000, 7000, 8000, 9000, and 10000, respectively. Sample approximate lines AL1, AL2, and AL3 illustrated in FIGS. 2 to 4 are acquired respectively via approximation using three, four, and five test points selected from among the nineteen measurement points. In addition, the sample approximate line may be acquired from more than three to five test points, or the sample approximate line may be acquired from two test points.

FIG. 2 is a diagram illustrating an example of a sample approximate line AL1 acquired by three test points. In the example illustrated in FIG. 2, three measurement points Pm1, Pm10, and Pm19 are selected as test points from among nineteen measurement points. In FIG. 2, the test points Pm1, Pm10, and Pm19 show test bit error rates Et1, Et10, and Et19 corresponding to the numbers of tests of 100, 1000, and 10000, respectively.

In the example illustrated in FIG. 2, nineteen measurement points are measured at the prototype stage of the magnetic disk device 1. The sample approximate line AL1 is obtained via approximation using the three test points Pm1, Pm10, and Pm19 selected from among the nineteen measurement points. In addition, the sample approximate line AL1 may be acquired via approximation using combinations of three test points other than the test points Pm1, Pm10, and Pm19 among the nineteen measurement points.

FIG. 3 is a diagram illustrating an example of a sample approximate line AL2 acquired by four test points. In the example illustrated in FIG. 3, four measurement points Pm1, Pm2, Pm14, and Pm15 are selected as test points from among nineteen measurement points. In FIG. 3, the test points Pm1, Pm2, Pm14, and Pm15 show test bit error rates Et1, Et2, Et14, and Et15 corresponding to the numbers of tests of 100, 200, 4000, and 5000, respectively.

In the example illustrated in FIG. 3, nineteen measurement points are measured at the prototype stage of the magnetic disk device 1. The sample approximate line AL2 is obtained via approximation using the four test points Pm1, Pm2, Pm14, and Pm15 selected from among the nineteen measurement points. In addition, the sample approximate line AL2 may be acquired via approximation using combinations of four test points other than the test points Pm1, Pm2, Pm14, and Pm15 among the nineteen measurement points.

FIG. 4 is a diagram illustrating an example of a sample approximate line AL3 acquired by five test points. In the example illustrated in FIG. 4, five measurement points Pm1, Pm2, Pm10, Pm14, and Pm15 are selected as test points from nineteen measurement points. In FIG. 4, the test points Pm1, Pm2, Pm10, Pm14, and Pm15 show test bit error rates Et1, Et2, Et10, Et14, and Et15 corresponding to the numbers of tests of 100, 200, 1000, 4000, and 5000, respectively.

In the example illustrated in FIG. 4, nineteen measurement points are measured at the prototype stage of the magnetic disk device 1. The sample approximate line AL3 is obtained via approximation using the five test points Pm1, Pm2, Pm10, Pm14, and Pm15 selected from the nineteen measurement points. In addition, the sample approximate line AL3 may be acquired via approximation using combinations of five test points other than the test points Pm1, Pm2, Pm10, Pm14, and Pm15 among the nineteen measurement points.

Figure 5:
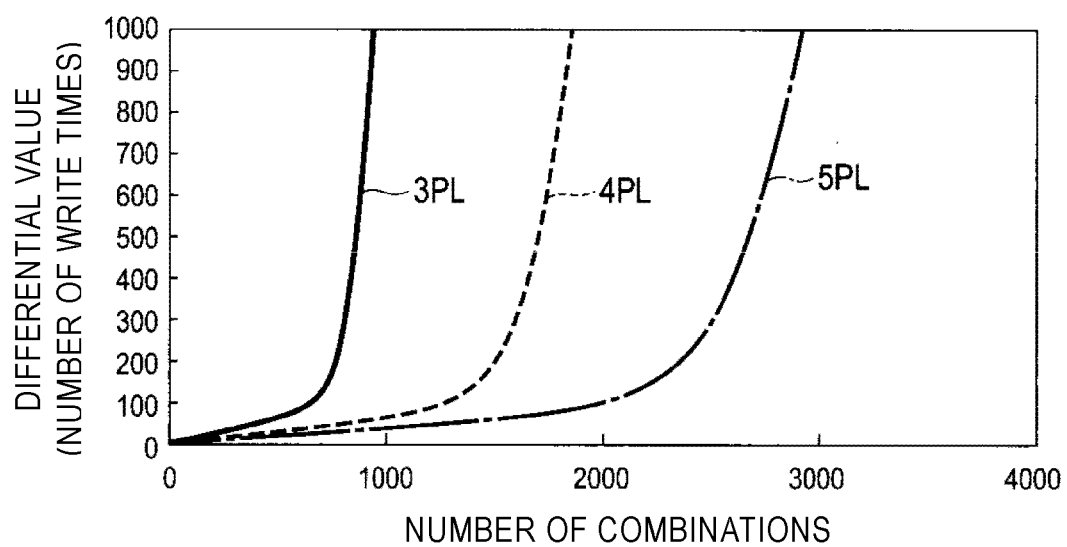
FIG. 5 is a diagram illustrating an example of a change in the differential value at a predetermined number of write times with respect to the number of combinations of the numbers of tests for each number of test points.

FIG. 5 is a diagram illustrating an example of a change in the differential value at a predetermined number of write times with respect to the number of combinations of the numbers of tests for each number of test points. In FIG. 5, the horizontal axis represents the number of possible combinations of the numbers of tests, and the vertical axis represents a differential value calculated as $(z1-z0)^2$, where $z1$ is a predetermined number of write times acquired based on a sample approximate line, for example, the guaranteed number, and $z2$ is a predetermined number of write times corresponding to a predetermined bit error rate in a predetermined recording area, for example, a measurement point corresponding to the guaranteed number which corresponds to a bit error rate threshold. According to FIG. 5, the smaller the differential value, the better the accuracy of the sample approximate line. FIG. 5 illustrates a change in the differential value 3PL (hereinafter, referred to as a three-differential line) with respect to the number of possible combinations of the numbers of tests (or the combinations of the numbers of tests) corresponding to three test points (here, the combination of the numbers of tests being also referred to as a group of the numbers of tests), a change in the differential value 4PL (hereinafter, referred to as a "four-differential line") with respect to the number of possible combinations of the numbers of tests (or the combinations of the numbers of tests) corresponding to four test points, and a change in the differential value 5PL (hereinafter, referred to as a "five-differential line") with respect to the number of possible combinations of the numbers of tests (or the combinations of the numbers of tests) corresponding to five test points. In FIG. 5, the three-differential line 3PL is denoted by the solid line, the four-differential line 4PL is denoted by the broken line, and the five-differential line 5PL is denoted by the one-dot dash line. For example, in FIG. 5, the three-differential line 3PL is acquired based on a sample approximate line which is acquired by selecting three test points from among nineteen measurement points as illustrated in FIGS. 2 to 4. For example, in FIG. 5, the four-differential line 4PL is acquired based on a sample approximate line which is acquired by selecting four test points from nineteen measurement points as illustrated in FIGS. 2 to 4. For example, in FIG. 5, the five-differential line 5PL is acquired based on a sample approximate line acquired by selecting five test points from nineteen measurement points as illustrated in FIGS. 2 to 4.

In the example illustrated in FIG. 5, the number of possible combinations of three numbers of tests corresponding to three test points among nineteen measurement points is equal to 19C3=969. For example, three test points corresponding to the combinations of three numbers of tests having the smallest differential value among 969 combinations of the three numbers of tests are set to setting points. The three numbers of tests corresponding respectively to the three test points which are set to the setting points are set to the numbers of settings.

In the example illustrated in FIG. 5, the number of possible combinations of four numbers of tests corresponding to four test points among nineteen measurement points is equal to 19C4=3876. For example, four test points corresponding to the combinations of four numbers of tests having the smallest differential value among 3876 combinations of the four numbers of tests are set to setting points. The four numbers of tests corresponding respectively to the four test points which are set to the setting points are set to the numbers of settings. In the example illustrated in FIG. 5, the number of possible combinations of five numbers of tests corresponding to five test points among nineteen measurement points is equal to 19C5=11628. For example, five test points corresponding to the combinations of five numbers of tests having the smallest differential value among 11628 combinations of the five numbers of tests are set to setting points. The five numbers of tests corresponding respectively to the five test points which are set to the setting points are set to the numbers of settings. In addition, three to five test points corresponding respectively to possible combinations of three to five numbers of tests having the smallest differential value may be set to setting points. In addition, test points corresponding to combinations of the numbers of tests having the smallest differential value among the combinations of three to five numbers of tests having the smallest differential value may be set to setting points.

Figure 6:
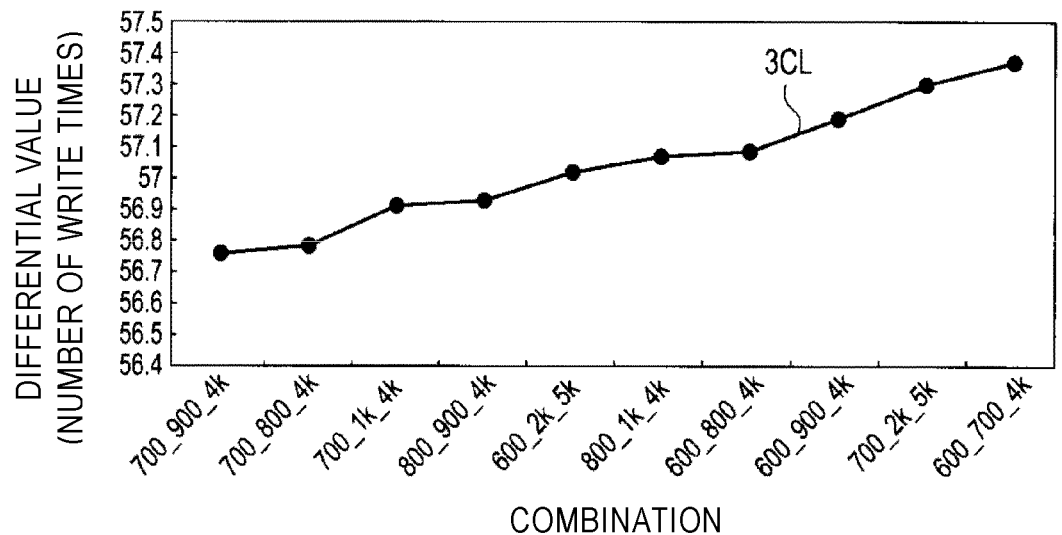
FIG. 6 is a diagram illustrating an example of a change in the differential value with respect to combinations of three numbers of tests.
Figure 7:
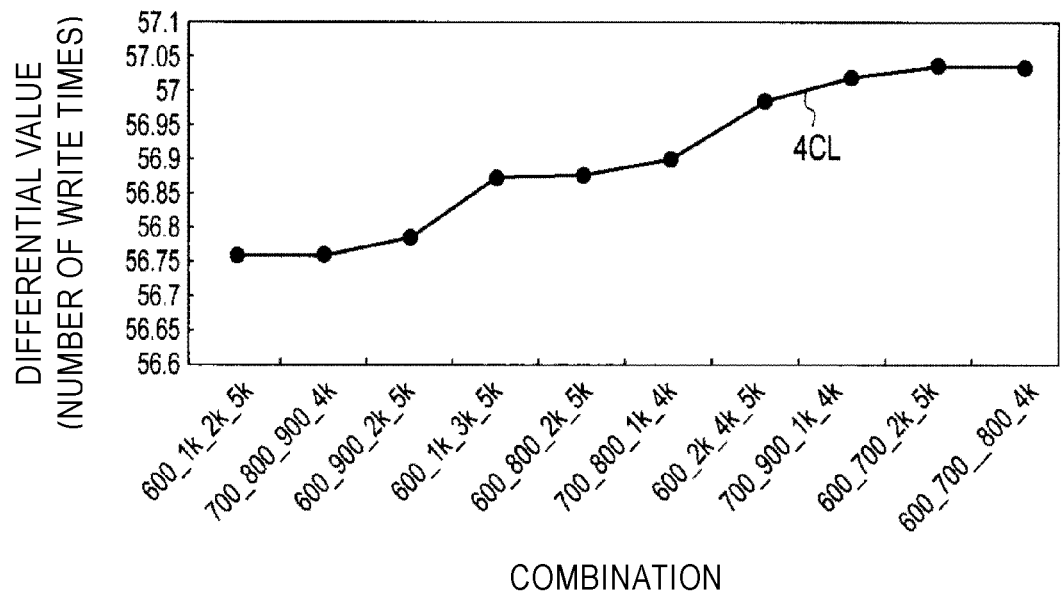
FIG. 7 is a diagram illustrating an example of a change in the differential value with respect to combinations of four numbers of tests.
Figure 8:
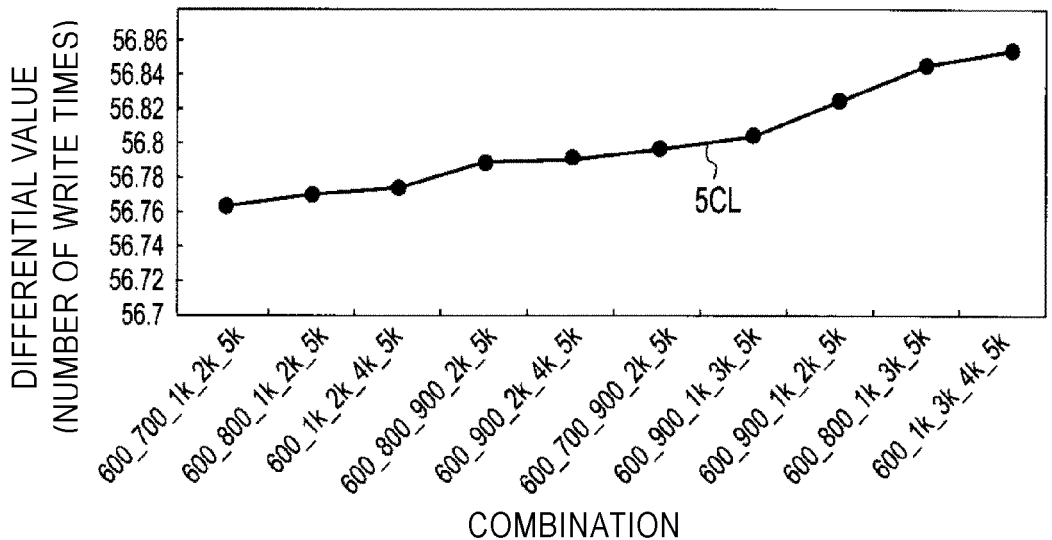
FIG. 8 is a diagram illustrating an example of a change in the differential value with respect to combinations of five numbers of tests.

An example of combinations of the numbers of settings will be described with reference to FIGS. 6, 7, and 8. In FIGS. 6 to 8, the horizontal axis represents combinations of the numbers of tests and the vertical axis represents the differential value. FIGS. 6 to 8 correspond to, for example, FIG. 5.

FIG. 6 is a diagram illustrating an example of the change in the differential value 3CL with respect to combinations of three numbers of tests. FIG. 6 illustrates ten combinations of three numbers of tests corresponding respectively to ten small differential values in order from the smallest differential value in the change in the differential value 3CL with respect to combinations of the three numbers of tests.

In the example illustrated in FIG. 6, three test points corresponding respectively to combinations of three numbers of tests 700, 900, and 4000 having the smallest differential value are set to setting points. In addition, the three numbers of tests 700, 900, and 4000 are set to the numbers of settings. Alternatively, three test points corresponding respectively to three numbers of tests other than combinations of three numbers of tests having the smallest differential value may be set to setting points.

FIG. 7 is a diagram illustrating an example of the change in the differential value 4CL with respect to combinations of four numbers of tests. FIG. 7 illustrates ten combinations of four numbers of tests corresponding to ten small differential values in order from the smallest differential value in the change in the differential value 4CL with respect to combinations of the four numbers of tests.

In the example illustrated in FIG. 7, four test points corresponding respectively to combinations of four numbers of tests 600, 1000, 2000, and 5000 having the smallest differential value are set to setting points. In addition, the four numbers of tests 600, 1000, 2000, and 5000 are set to the numbers of settings. Alternatively, four test points corresponding respectively to four numbers of tests other than combinations of four numbers of tests having the smallest differential value may be set to setting points.

FIG. 8 is a diagram illustrating an example of the change in the differential value 5CL with respect to combinations of five numbers of tests. FIG. 8 illustrates ten combinations of five numbers of tests corresponding to ten small differential values in order from the smallest differential value in the change in the differential value 5CL with respect to combinations of the five numbers of tests.

In the example illustrated in FIG. 8, five test points corresponding respectively to combinations of five numbers of tests 600, 700, 1000, 2000, and 5000 having the smallest differential value are set to setting points. In addition, the five numbers of tests 600, 700, 1000, 2000, and 5000 are set to the numbers of settings. Alternatively, five test points corresponding respectively to five numbers of tests other than combinations of five numbers of tests having the smallest differential value may be set to setting points.

Figure 9:
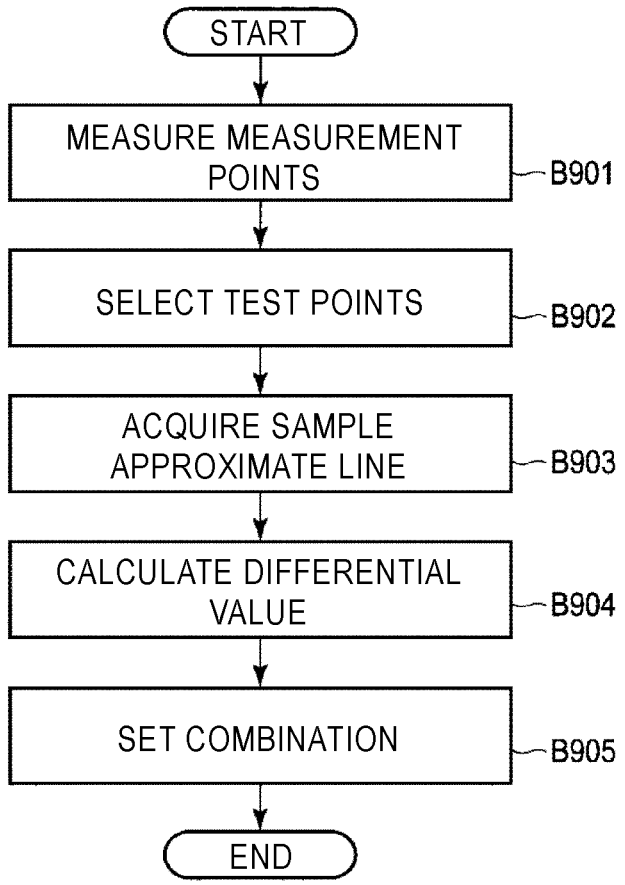
FIG. 9 is a flowchart illustrating an example of a method of setting combinations of numbers of settings.

FIG. 9 is a flowchart illustrating an example of a method of setting combinations of the numbers of settings.

A plurality of measurement points are measured in a predetermined recording area of the disk 10 of the magnetic disk device 1 (B901), and several test points (hereinafter, also referred to as a group of test points) are selected from among the plurality of measurement points which are measured (B902). For example, three to five test points are selected from among the plurality of measurement points. A sample approximate line is acquired by the selected several test points (B903). A differential value between an approximate point which corresponds to a predetermined number of write times corresponding to a predetermined bit error rate acquired based on the sample approximate line, for example, the guaranteed number corresponding to a bit error rate threshold and a measurement point which corresponds to a predetermined number of write times corresponding to a predetermined bit error rate in a predetermined recording area, for example, the guaranteed number corresponding to the bit error rate threshold is calculated (B904). For example, by repeating a processing from B902 to B904, a plurality of sample approximate lines are acquired by a plurality of combinations of three to five test points, and a plurality of differential values between a plurality of write times acquired respectively based on the plurality of sample approximate lines and a plurality of measurement points corresponding respectively to the plurality of write times are acquired. Combinations of several numbers of tests in a predetermined recording area are set to the number of settings (B905), and the processing is terminated. In particular, combinations of several numbers of tests corresponding to the smallest differential value among the plurality of differential values are set to the number of settings, and the processing is terminated. The processing illustrated in FIG. 9 is executed, for example, at the prototype stage of the magnetic disk device 1. Alternatively, the processing illustrated in FIG. 9 may be executed at a stage other than the prototype stage of the magnetic disk device 1.

Figure 10:
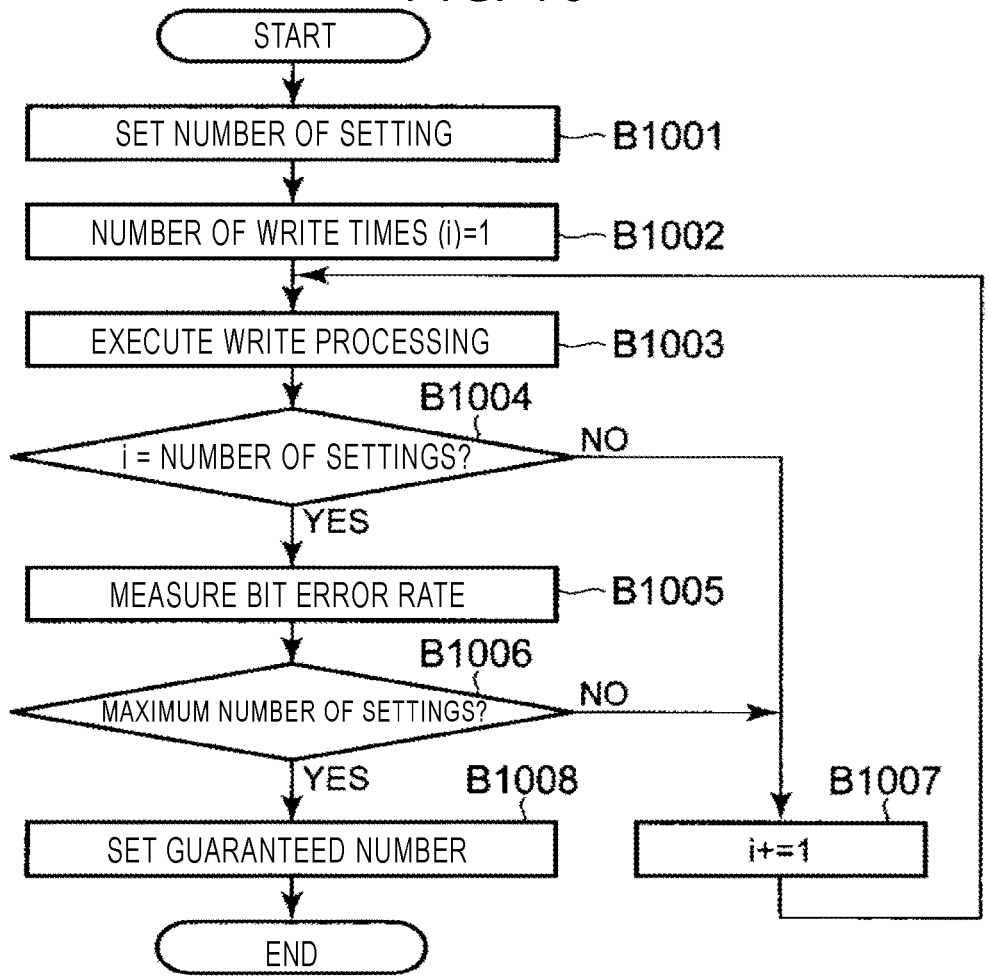
FIG. 10 is a flowchart illustrating an example of a method of setting a guaranteed number.

FIG. 10 is a flowchart illustrating an example of a method of setting the guaranteed number.

The MPU 60 sets several numbers of settings which are set in FIG. 9 in a predetermined recording area (B1001), sets the number of write times to i=1 (B1002), and executes a write processing in an adjacent area (B1003). The MPU 60 determines whether or not the number of write times i has reached the number of settings (B1004). When it is determined that the number of write times i has not reached the number of settings (NO in B1004), the MPU 60 increments the number of write times i by 1 (B1007) and proceeds to a processing of B1003. When it is determined that the number of write times i has reached the number of settings (YES in B1004), the MPU 60 measures a bit error rate (setting bit error rate) (B1005), and determines whether or not the number of settings is the maximum number of settings among several numbers of settings (B1006). When it is determined that the number of settings is not the maximum number of settings (NO in B1006), the MPU 60 proceeds to a processing of B1007. When it is determined that the number of settings is the maximum number of settings (YES in B1006), the MPU 60 sets the guaranteed number based on an approximate expression acquired using the setting bit error rate measured at each number of settings and a bit error rate threshold (B1008), and terminates the processing.

According to the present embodiment, in a predetermined recording area of the disk 10 of the magnetic disk device 1, a plurality of measurement points are measured, several test points are selected from among the plurality of measurement points which are measured, and a sample approximate line is acquired by the selected several test points. A differential value between the guaranteed number which is acquired based on the sample approximate line and a measurement point which corresponds to the guaranteed number corresponding to a bit error rate threshold in the predetermined recording area is calculated. After calculating one differential value, a processing of selecting several test points from among the plurality of measurement points, acquiring a sample approximate line by the selected several test points, and calculating a differential value between the guaranteed number acquired based on the sample approximate line and a measurement point corresponding to the guaranteed number is repeated again to acquire a plurality of differential values. In the magnetic disk device 1, combinations of several numbers of tests corresponding to the smallest differential value among the plurality of acquired differential values are set to the number of settings. The magnetic disk device 1 measures several bit error rates corresponding respectively to several numbers of settings which are set in the predetermined recording area, acquires an approximate line by the measured several bit error rates, and sets the guaranteed number based on the approximate line and a bit error rate threshold. Therefore, it is possible to provide a method of setting the guaranteed number (i.e., the upper limit value of the number of write times) which is highly accurate and is capable of shortening a processing time and a magnetic disk device. In addition, the magnetic disk device 1 may execute a processing of setting combinations of the numbers of settings. In addition, when reaching a predetermined timing or a predetermined number of write times, the magnetic disk device 1 may automatically execute the processing of setting combinations of the numbers of settings or the processing of setting the guaranteed number described above. In this case, for example, the guaranteed number may be updated according to aged deterioration of the magnetic disk device 1.

Next, a magnetic disk device according to a modification will be described. In the modification, the same reference numerals will be given to the same elements as those of the above-described embodiment, and a detailed description thereof will be omitted.

(Modification 1)

A method of setting combinations of the numbers of tests on the magnetic disk device 1 of Modification 1 is different from the setting method of the above-described embodiment.

In Modification 1, a threshold of a differential value (hereinafter, referred to as a differential threshold) is set, and several test points which correspond to combinations of several numbers of tests having the smallest maximum number of tests of the several numbers of tests (hereinafter, simply referred to as "the maximum number of tests) among a plurality of combinations of several numbers of tests in which differential values are equal to or less than the differential threshold are set to setting points.

Figure 11:
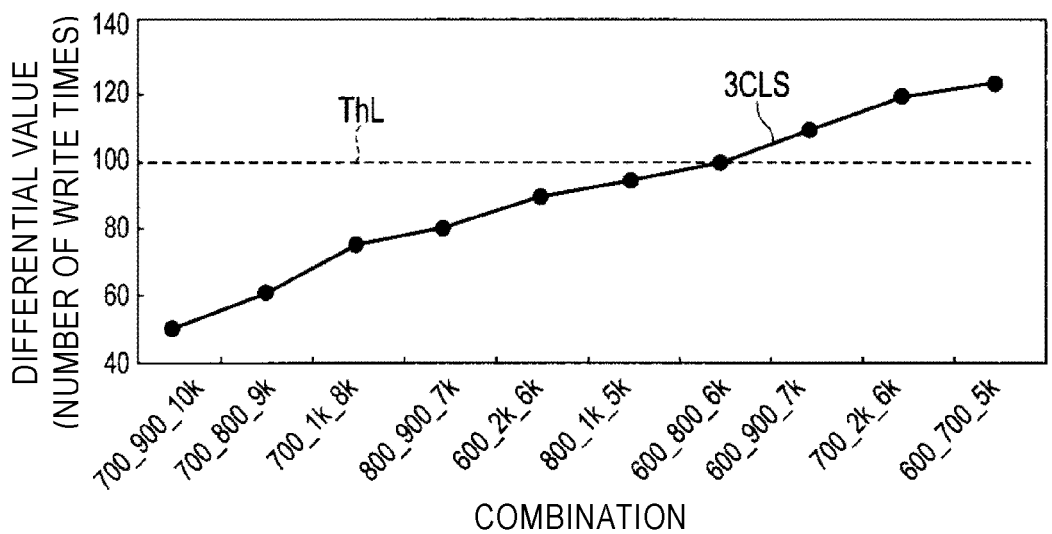
FIG. 11 is a diagram illustrating an example of a change in the differential value with respect to combinations of three numbers of tests.

FIG. 11 is a diagram illustrating an example of the change in the differential value 3CLS with respect to combinations of three numbers of tests. In FIG. 11, the horizontal axis represents combinations of the numbers of tests and the vertical axis represents the differential value. In FIG. 11, the three-differential line 3CLS is denoted by the solid line and a differential threshold ThL is denoted by the broken line. For example, in FIG. 11, the three-differential line 3CLS is acquired based on a sample approximate line acquired by selecting three test points from nineteen measurement points as illustrated in FIGS. 2 to 4. FIG. 11 illustrates ten combinations of three numbers of tests corresponding respectively to ten small differential values in order from the smallest differential value in the change in the differential value 3CLS with respect to combinations of the three numbers of tests.

In the example illustrated in FIG. 11, among a plurality of combinations of three numbers of tests corresponding respectively to a plurality of differential values which are equal to or less than a differential threshold, three test points corresponding respectively to three numbers of tests 800, 1000, and 5000 having the smallest maximum number of tests are set to setting points.

According to Modification 1, in the magnetic disk device 1, among a plurality of combinations of several numbers of tests corresponding respectively to a plurality of differential values which are equal to or less than a differential threshold, several test points corresponding respectively to several numbers of tests having the smallest maximum number of tests are set to setting points. Therefore, it is possible to provide a method of setting the guaranteed number which is capable of shortening a processing time and a magnetic disk device.

(Modification 2)

A method of setting combinations of the numbers of tests on the magnetic disk device 1 of Modification 2 is different from the setting methods of the above-described embodiment and Modification 1.

In Modification 2, an approximate point which corresponds to a predetermined number of write times corresponding to a predetermined bit error rate acquired based on a sample approximate line in a predetermined recording area of the disk 10, for example, the guaranteed number corresponding to a bit error rate threshold is compared with a measurement point which corresponds to a predetermined number of write times corresponding to a predetermined bit error rate in the predetermined recording area, for example, the guaranteed number corresponding to a bit error rate threshold, and several test points corresponding to combinations of several numbers of tests in which the approximate point is smaller than the measurement point are set to setting points. That is, several test points corresponding to combinations of several numbers of tests in which the approximate point is larger than the measurement point are not set to setting points.

FIG. 12 is a diagram illustrating an example of a relationship between the approximate point and the measurement point in a predetermined recording area of the disk 10. In FIG. 12, the horizontal axis represents the measurement points corresponding to the number of write times in a predetermined recording area of the disk 10, and the vertical axis represents the approximate points corresponding to the number of write times in the predetermined recording area of the disk 10. FIG. 12 illustrates a straight line BL indicating that the approximate points and the measurement points coincide with each other in the predetermined recording area. In FIG. 12, square dots indicate a relationship between the approximate points and the measurement points in combinations of three numbers of tests 100, 1000, and 3000, for example, and circular dots indicate, for example, a relationship between the approximate points and the measurement points in combinations of three numbers of tests 100, 1000, and 3000. FIG. 12 illustrates an area AR1 in which the approximate point is larger than the measurement point and an area AR2 in which the approximate point is smaller than the measurement point.

In the example illustrated in FIG. 12, the square dots are located in the area AR1 in which the number of write times is large. That is, in the combinations of three numbers of tests 100, 1000, and 3000, the approximate point becomes larger than the measurement point as the number of write times increases. Therefore, the number of write times reaches the guaranteed number corresponding to the measurement point before reaching the guaranteed number corresponding to the approximate point on the sample approximate line acquired based on the combinations of three numbers of tests 100, 1000, and 3000. Therefore, three test points corresponding to the combinations of three numbers of tests 100, 1000, and 3000 are not set to setting points.

In the example illustrated in FIG. 12, the circular dots are located in the area AR2. That is, in the combinations of three numbers of tests 100, 1000, and 10000, the approximate point is smaller than the measurement point at all of the write times. Therefore, the number of write times reaches the guaranteed number corresponding to the approximate point on the sample approximate line acquired based on the combinations of the three numbers of tests 100, 1000, and 10000 before reaching the guaranteed number corresponding to the measurement point. Therefore, three test points corresponding to the combinations of the three numbers of tests 100, 1000, and 10000 are set to setting points.

According to Modification 2, in the magnetic disk device 1, an approximate point which corresponds to a predetermined number of write times corresponding to a predetermined bit error rate acquired based on a sample approximate line in a predetermined recording area of the disk 10, for example, the guaranteed number corresponding to a bit error rate threshold is compared with a measurement point which corresponds to a predetermined number of write times corresponding to a predetermined bit error rate in the predetermined recording area, for example, the guaranteed number corresponding to a bit error rate threshold, and several test points corresponding to combinations of several numbers of tests in which the approximate point is smaller than the measurement point are set to setting points. Therefore, it is possible to provide a method of setting the guaranteed number which is capable of enhancing the reliability of data and a magnetic disk device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of setting an upper limit value of the number of write times, the method being applied to a magnetic disk device including a disk and a head configured to write data to the disk and read the data from the disk, the method comprising:
    measuring a plurality of bit error rates in a recording area of the disk upon repeatedly writing to an area of the disk adjacent to the recording area a number of write times;
    deriving a function that approximates a bit error rate in relation to a number of write times, using the measured bit rates corresponding to at least a first number of write times, a second number of write times, and a third number of write times; and
    applying the function to determine a number of write times that correspond to a first threshold bit error rate that makes the data on the disk unreadable, and setting the determined number of write times as the upper limit value of the number of write times.

2. The method according to claim 1, further comprising:
    selecting the first, second, and third number of write times that best approximate the measured bit error rates in relation to the number of write times.

3. The method according to claim 1, wherein the function that approximates the bit error rate in relation to the number of write times is derived using the measured bit rates corresponding to the first number of write times, the second number of write times, the third number of write times, and a fourth number of write times.

4. The method according to claim 3, further comprising:
    selecting the first, second, third, and fourth number of write times that best approximate the measured bit error rates in relation to the number of write times.

5. The method according to claim 1, wherein the function that approximates the bit error rate in relation to the number of write times is derived using the measured bit rates corresponding to the first number of write times, the second number of write times, the third number of write times, a fourth number of write times, and a fifth number of write times.

6. The method according to claim 5, further comprising:
    selecting the first, second, third, fourth, and fifth number of write times that best approximate the measured bit error rates in relation to the number of write times.

7. A magnetic disk device comprising:
    a disk;
    a head configured to write data to the disk and read the data from the disk; and
    a controller configured to
    measure a plurality of bit error rates in a recording area of the disk upon repeatedly writing to an area of the disk adjacent to the recording area a number of write times,
    derive a function that approximates a bit error rate in relation to a number of write times, using the measured bit rates corresponding to at least a first number of write times, a second number of write times, and a third number of write times,
    apply the function to determine a number of write times that correspond to a first threshold bit error rate that makes the data on the disk unreadable, and
    set the determined number of write times as the upper limit value of the number of write times.

8. The magnetic disk device according to claim 7, wherein the controller is further configured to
    select the first, second, and third number of write times that best approximate the measured bit error rates in relation to the number of write times.

9. The magnetic disk device according to claim 7, wherein the function that approximates the bit error rate in relation to the number of write times is derived using the measured bit rates corresponding to the first number of write times, the second number of write times, the third number of write times, and a fourth number of write times.

10. The magnetic disk device according to claim 9, wherein the controller is further configured to:
    select the first, second, third, and fourth number of write times that best approximate the measured bit error rates in relation to the number of write times.

11. The magnetic disk device according to claim 7, wherein the function that approximates the bit error rate in relation to the number of write times is derived using the measured bit rates corresponding to the first number of write times, the second number of write times, the third number of write times, a fourth number of write times, and a fifth number of write times.

12. The magnetic disk device according to claim 11, wherein the controller is further configured to:
    select the first, second, third, fourth, and fifth number of write times that best approximate the measured bit error rates in relation to the number of write times.

* * * * *